(12) United States Patent
Wilkinson

(10) Patent No.: US 8,514,753 B2
(45) Date of Patent: *Aug. 20, 2013

(54) DATA FORMAT AND DATA TRANSFER

(75) Inventor: James Hedley Wilkinson, Tadley (GB)

(73) Assignee: Sony United Kingdom Limited, Weybridge (GB)

( * ) Notice: Subject to any disclaimer, the term of this patent is extended or adjusted under 35 U.S.C. 154(b) by 578 days.

This patent is subject to a terminal disclaimer.

(21) Appl. No.: 12/036,561

(22) Filed: Feb. 25, 2008

(65) Prior Publication Data

US 2008/0144664 A1    Jun. 19, 2008

Related U.S. Application Data

(63) Continuation of application No. 09/706,127, filed on Nov. 3, 2000, now Pat. No. 7,336,681.

(30) Foreign Application Priority Data

Nov. 5, 1999    (GB) .................................. 9926325.3

(51) Int. Cl.
    H04L 12/56    (2011.01)
(52) U.S. Cl.
    USPC ........................................................ 370/289
(58) Field of Classification Search
    USPC ................. 370/391, 393, 471–473, 389, 390,
        370/392, 394, 474, 466; 386/45, 98, 124–126;
        375/240.28
    See application file for complete search history.

(56) References Cited

U.S. PATENT DOCUMENTS

| 4,506,358 | A |   | 3/1985  | Montgomery |
| 5,548,532 | A | * | 8/1996  | Menand et al. ............... 370/477 |
| 5,621,840 | A |   | 4/1997  | Kawamura et al. |
| 5,696,557 | A |   | 12/1997 | Yamashita et al. |
| 5,771,330 | A | * | 6/1998  | Takano et al. .................. 386/282 |
| 5,784,528 | A |   | 7/1998  | Yamane et al. |

(Continued)

FOREIGN PATENT DOCUMENTS

EP    0 805 601    11/1997

OTHER PUBLICATIONS

J.H. Wilkinson, Packetised Stream Formats for the SDTI, 1997, IEEE, entire document, Sony Broadcast & professional Europe, U.K.*

(Continued)

*Primary Examiner* — Mark Rinehart
*Assistant Examiner* — Maharishi Khirodhar
(74) *Attorney, Agent, or Firm* — Oblon, Spivak, McClelland, Maier & Neustadt, L.L.P.

(57) ABSTRACT

A signal format that can be accessed, as a file, by the computer on which it is stored is provided with a plurality of concatenated content packages. The content package comprises System, Picture, Audio and Auxiliary Items. The System, Picture, Audio and Auxiliary Items have a common format including a 16 byte SMPTE Universal Label, a Word Count, and Data. The Item Label has a predetermined length which is set to fixed value except for the byte identifying the Item to which the label belongs. The data of the System Item includes a set of Metadata blocks, which has an initial Metadata Count byte defining the number of blocks in the set. A metadata block may include a metadata Link which links the metadata of that block to the essence of the element of the Auxiliary Item with which element it is associated.

7 Claims, 6 Drawing Sheets

Prior Art

System Item Structure

(56) References Cited

U.S. PATENT DOCUMENTS

| | | | |
|---|---|---|---|
| 5,898,687 A * | 4/1999 | Harriman et al. | 370/390 |
| 6,067,400 A | 5/2000 | Saeki et al. | |
| 6,141,358 A * | 10/2000 | Hurst et al. | 370/543 |
| 6,295,296 B1 | 9/2001 | Tappan | |
| 6,341,198 B1 | 1/2002 | Mendenhall et al. | |
| 6,499,061 B1 | 12/2002 | Benayoun et al. | |
| 6,501,904 B1 | 12/2002 | Kuroda et al. | |
| 6,512,794 B1 | 1/2003 | Fujiwara et al. | |
| 6,512,882 B1 | 1/2003 | Teunissen | |
| 6,553,028 B1 | 4/2003 | Tang et al. | |
| 6,556,590 B1 | 4/2003 | Saeijs et al. | |
| 6,567,980 B1 | 5/2003 | Jain et al. | |
| 6,580,711 B1 | 6/2003 | Muto | |
| 6,631,116 B1 | 10/2003 | Eneroth et al. | |
| 6,687,208 B2 | 2/2004 | Asada et al. | |
| 6,741,795 B1 | 5/2004 | Takehiko et al. | |
| 7,336,681 B1 * | 2/2008 | Wilkinson | 370/471 |

OTHER PUBLICATIONS

Wilkinson, J.H., Packetised stream formats for the SDTI-appear in the EBU-SMPTE Task Force: Building an Infrastructure for Managing Compressed Video Systems; Dec. 5, 1997; IEEE, Ref# 1997/382, pp. 10/1-10/7.

Wilkinson, J.H., SDDI as a video data network solution-appear in Broadcasting Convention 1997; Sep. 12-16, 1997; IEEE, pp. 380-385.

* cited by examiner

*Fig. 1* Arrangement of System, Picture, Audio and
PRIOR ART Auxiliary Items in a Content Package on SDTI.
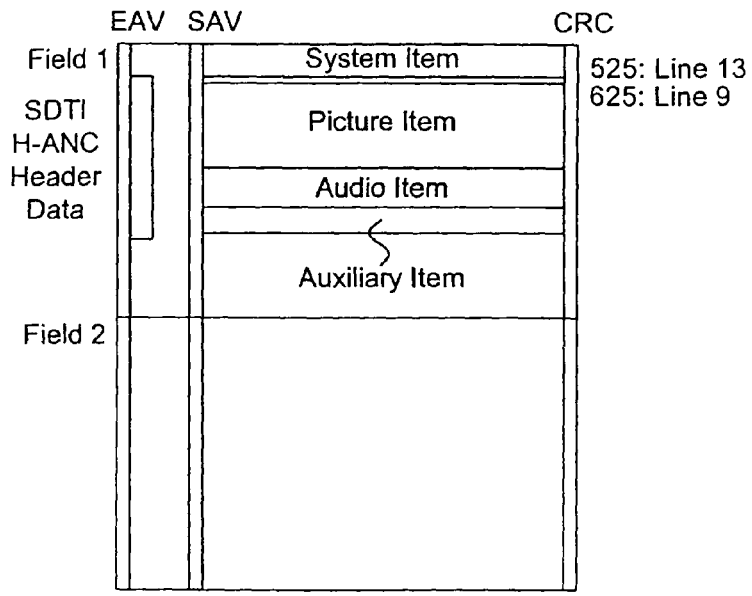
*Fig. 2* Content Package Structure.
PRIOR ART
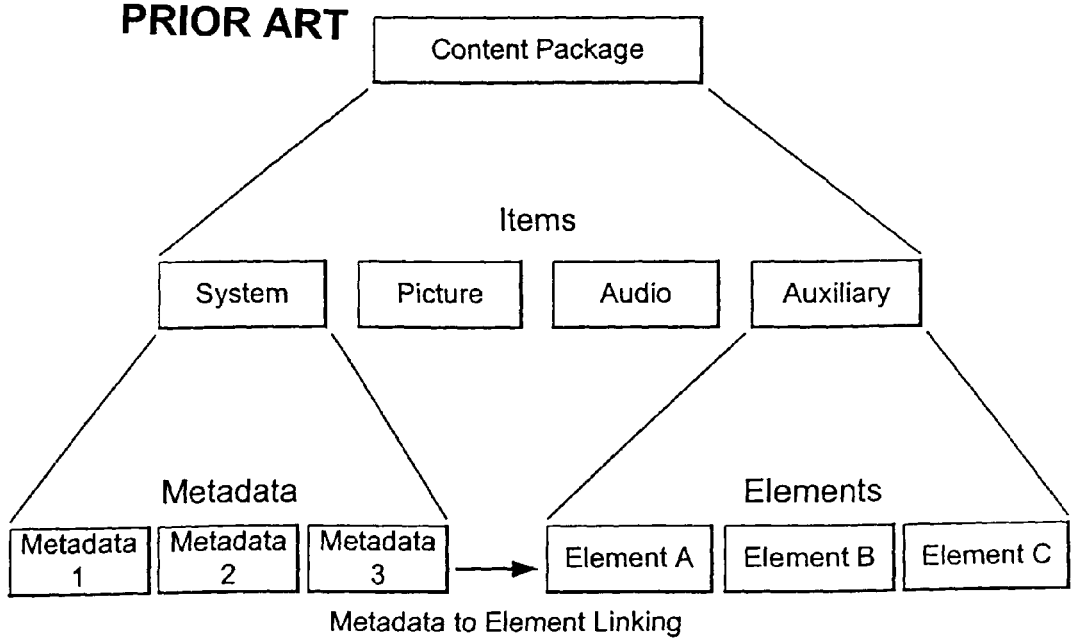

PRIOR ART
Fig. 3 Format of the SDTI Variable Block.
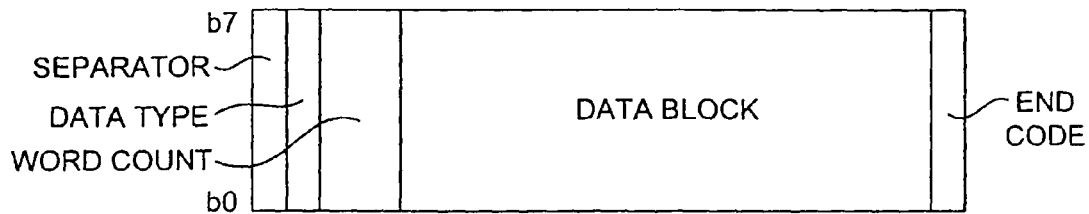
Fig. 4 System, Picture, Audio and Auxiliary Items in one Content Package.
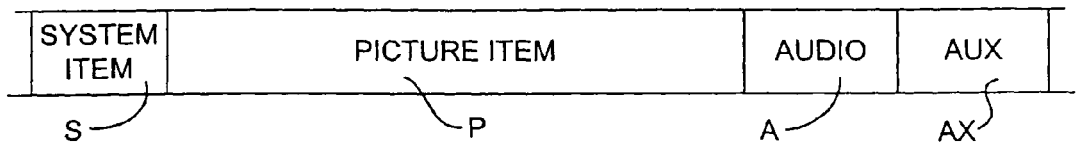
Fig. 5 Data Structure of each Item Variable Block.
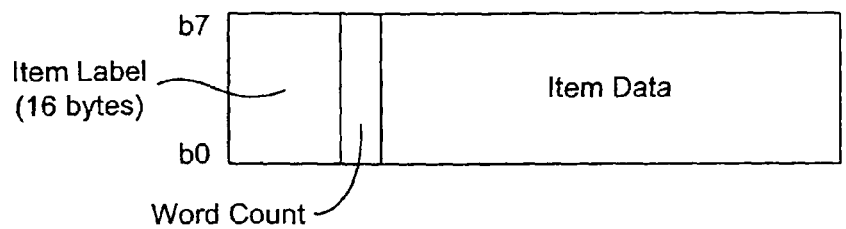
Fig. 6 Structure of Picture, Audio and Auxiliary Items.
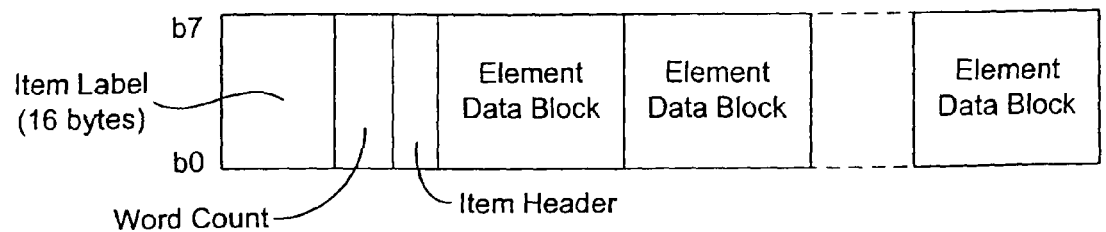

Fig. 7  Structure of Element Data Blocks.
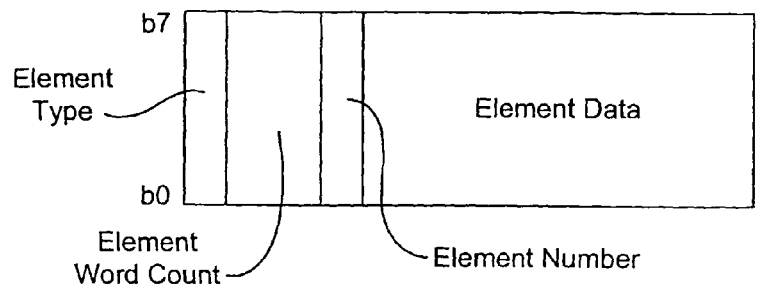
Fig. 9  Structure for Metadata Sets.
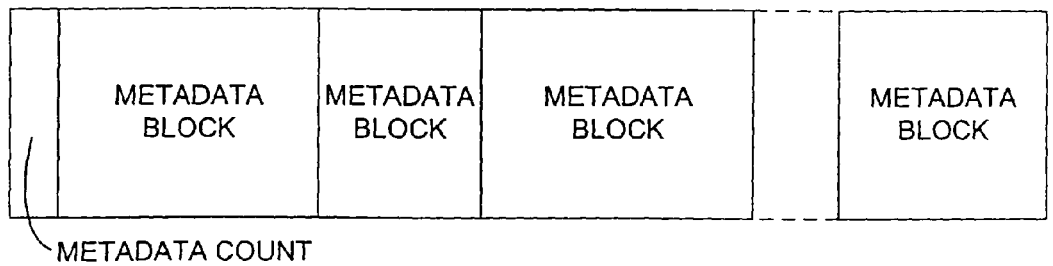
Fig. 10  Structure for a Metadata Block including the Link Metadata.
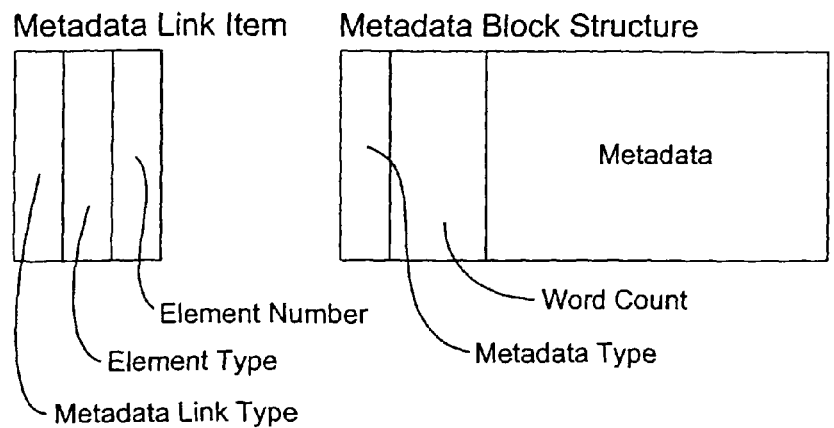

DATA FORMAT AND DATA TRANSFER

CROSS-REFERENCE TO RELATED APPLICATIONS

This application is a continuation of U.S. application Ser. No. 09/706,127, filed Nov. 3, 2000, now issued as U.S. Pat. No. 7,336,681, and is based upon and claims the benefit of priority from the prior British Patent Application No. 9926325.3 filed on Nov. 5, 1999, the entire contents of each of which are incorporated herein by reference.

BACKGROUND OF THE INVENTION

1. Field of the Invention

The present invention relates to a data format, a method of transferring data and a data transfer system.

2. Description of the Prior Art

"SDTI-CP: is described in the paper "Intra-Studio Distribution of Programme Bitstreams" by J. H Wilkinson and H. Nakano and published in/at IBC 99 Amsterdam 10-14 Sep. 1999.

The SDTI (Serial Data Transport Interface) is defined in SMPTE 305M. It is also reviewed in the paper "Interconnectivity in the DTV Era: The Emergence of SDTI" by A. Legault and J. Matey and published in/at IBC 99 Amsterdam 10-14 Sep. 1999.

Referring to FIG. 1 STDI transmits packets in a signal structure comprising frames of television lines. Ancillary data (ANC) is carried in the horizontal blanking area (H-ANC) of lines and data is carried in a payload area of each line. The payload area is in the active line interval. SDTI allows packets to be routed wherever SDI connections are available and also allows packets from more than one source to be transmitted. SDI is the Serial Digital Interface defined by ITUR 656.

The SDTI-CP paper proposes that "Content Packages" (CP) are used to transfer primarily MPEG-2 encoded bitstreams using the SDTI. However other bitstreams can also be transferred.

A content package has a structure as shown in FIG. 2.

Each Content Package contains a video frame and associated audio and auxiliary data as shown in FIG. 1. It is constructed of up to four Items each comprising one or more Elements. The four Items are System, Picture, Audio and Auxiliary. There is always a System Item and at least one other Item. Picture and Audio Items are essentially stream Elements carrying the primary components of television. These two Items are often routed to specialist storage or processing equipment. Auxiliary data is used to carry data-centric content such as sub-titles, teletext and closed caption data and is frequently created, processed and stored on computer media. As digital delivery services increase, Auxiliary data types can be expected to grow in number, volume and complexity. Finally, the system Item provides services for the package as a whole through package metadata such as time stamps, metadata for Elements in the other three Items and finally, a downstream package control element.

The Picture, Audio and Auxiliary data Items can consist of up to 255 Elements which represents a potentially massive streaming capability. Each Content Package contains the associated contents of one frame period starting with a System Item and optionally containing Picture, Audio and Auxiliary Items. FIG. 2 shows the layered structure of a Content Package.

The metadata contained in the System Item has a link which associates any metadata Item uniquely with its associated element. In many cases, metadata is contained in the element (e.g. in the case of MPEG-2, metadata is contained in the various headers of the MPEG-2 bitstream). The external metadata link is provided to either replicate the metadata embedded in the Element or to provide additional metadata not contained in the element. Replicating the embedded metadata from an Element can provide quick access to key metadata without the need to re-parse the element bitstream.

Each content package CP must contain a System Item and the package is completed with any of the other Items. The System Item must appear first in order to provide a recognisable starting point and there can only be one Item of any type in any one package. A typical arrangement of System, Picture, Audio and Auxiliary data Items in a video field is shown in FIG. 1.

Each Item as described above is formatted as an SDTI 'Variable Block'. The format of each SDTI variable block is shown in FIG. 3. The SDTI variable block has an ENDCODE and a SEPARATOR word as shown in FIG. 3. The SEPARATOR word is followed by a DATATYPE word which words together act as a START CODE.

Each block begins with the 'Separator' word and terminates with the "End Code" word. The "separator" word starts immediately following an SAV sequence. Thus, the start of a Content Package is defined by the detection of a System Item 'Type' code.

The SDTI-CP format as described in the paper is excellent for streaming video, audio and auxiliary data.

However, the present inventor has recognised that there is a need for a format which is compatible with computer files to allow data, primarily MPEG-2 encoded bitstreams but also other bitstreams, to be transferred, stored and manipulated as computer files. However, computer files have the limitation that they can only be accessed as a whole file.

SUMMARY OF THE INVENTION

According to one aspect of the present invention, there is provided a signal format comprising a Content Package having at least a System Item and one or more of a Picture Item, an Audio Item and an Auxiliary Item, wherein the or each of the System, Picture, Audio and Auxiliary Items comprises: a Label having a predetermined number of bytes and including at least one byte identifying the Item; a word count indicating the number of bytes of data of the Item; and the data of the Item.

The start and end codes of the SDTI signal are removed and the Label replaces the start code. The presence of the Label identifies the format as a file format. Preferably the label is an SMPTE universal label. In preferred embodiments of the invention the label has a fixed pattern of bits for all Items except for bits which identify the Item to which the label belongs. Thus the label acts as an identifier for the beginning of each Item.

According to another aspect of the invention, there is provided a file for storage in a computer system and comprising a concatenation of Content Packages as defined in the one aspect. The file is accessed by the Operating system of the computer system in which it is stored and processed. The file may be processed like any other file in the computer system. The format of a concatenation of the Content packages with the labels allows the file to be processed as a normal file. In addition, the presence of the labels allows random access of any content package within the file.

Other Aspects of the Invention Provide:

Apparatus for forming a content package comprising an input for receiving an SDTI signal comprising an SDTI Content Package having at least a System Item and one or more of a Picture Item, an Audio Item and an Auxiliary Item, wherein the or each of the System, Picture, Audio and Auxiliary Items comprises a start code, a word count indicating the number of bytes of data of the Item, the data of the Item and an end code; and a format converter for removing the start and end codes; and for inserting a Label in place of the start code, the Label having a predetermined number of bytes and at least one byte identifying the Item.

A method of producing a signal, comprising forming a Content Package by concatenating at least a System Item and one or more of a Picture Item, an Audio Item and an Auxiliary Item, the or each of the System, Picture, Audio and Auxiliary Items being formed by concatenating: a Label having a predetermined number of bytes and including at least one byte identifying the Item; a word count indicating the number of bytes of data of the Item; and the data of the Item.

A method of forming a signal comprising the steps of: receiving an SDTI signal comprising an SDTI Content Package having at least a System Item and one or more of a Picture Item, an Audio Item and an Auxiliary Item, wherein the or each of the System, Picture, Audio and Auxiliary Items comprises a start code, a word count indicating the number of bytes of data of the Item, the data of the Item and an end code; removing the start and end codes; and: inserting a Label in place of the start code, the label having a predetermined number of bytes and at least one byte identifying the Item.

A method of forming a signal comprising the steps of: receiving an signal comprising a Content Package having at least a System Item and one or more of a Picture Item, an Audio Item and an Auxiliary Item, wherein the or each of the System, Picture, Audio and Auxiliary Items comprises a, Label having a predetermined number of bytes and at least one byte identifying the Item a word count indicating the number of bytes of data of the Item, and the data of the Item and; removing the Label of each Item; inserting a start code in place of the Label; and inserting an end code; to thereby produce an SDTI signal.

A format converter comprising: an input for receiving an SDTI signal comprising an SDTI Content Package having at least a System Item and one or more of a Picture Item, an Audio Item and an Auxiliary Item, wherein the or each of the System, Picture, Audio and Auxiliary Items comprises a start code, a word count indicating the number of bytes of data of the Item, the data of the Item and an end code; and means for removing the start and end codes; and for inserting a Label in place of the start code, the Label having a predetermined number of bytes and at least one byte identifying the Item.

A format converter comprising: an input for receiving a signal comprising a Content Package having at least a System Item and one or more of a Picture Item, an Audio Item and an Auxiliary Item, wherein the or each of the System, Picture, Audio and Auxiliary Items comprises a Label having a predetermined number of bytes and at least one byte identifying the Item a word count indicating the number of bytes of data of the Item, and the data of the Item; and means for removing the Label of each Item, and for inserting a start code in place of the Label, and for inserting an end code, to thereby produce an SDTI signal.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 1 shows a known arrangement of System, Picture Audio and Auxiliary Items in a Content Package on SDTI;

FIG. 2 shows a known arrangement of the structure of a Content Package which known arrangement is also used in embodiments of the present invention;

FIG. 3 shows a known format of an SDTI Variable Block;

FIG. 4 shows an example of a Content Package;

FIG. 5 shows a Data Structure in accordance with an embodiment of the invention of an Item of a Content Package;

FIG. 6 shows a Data Structure for Picture, Audio and Auxiliary Items;

FIG. 7 shows a Data Structure for an Element Data Block of a Picture, Audio, or Auxiliary Item;

FIG. 9 shows a structure of a Metadata set;

FIG. 10 shows structures of Metadata Blocks;

DESCRIPTION OF THE PREFERRED EMBODIMENTS

Figure 8:
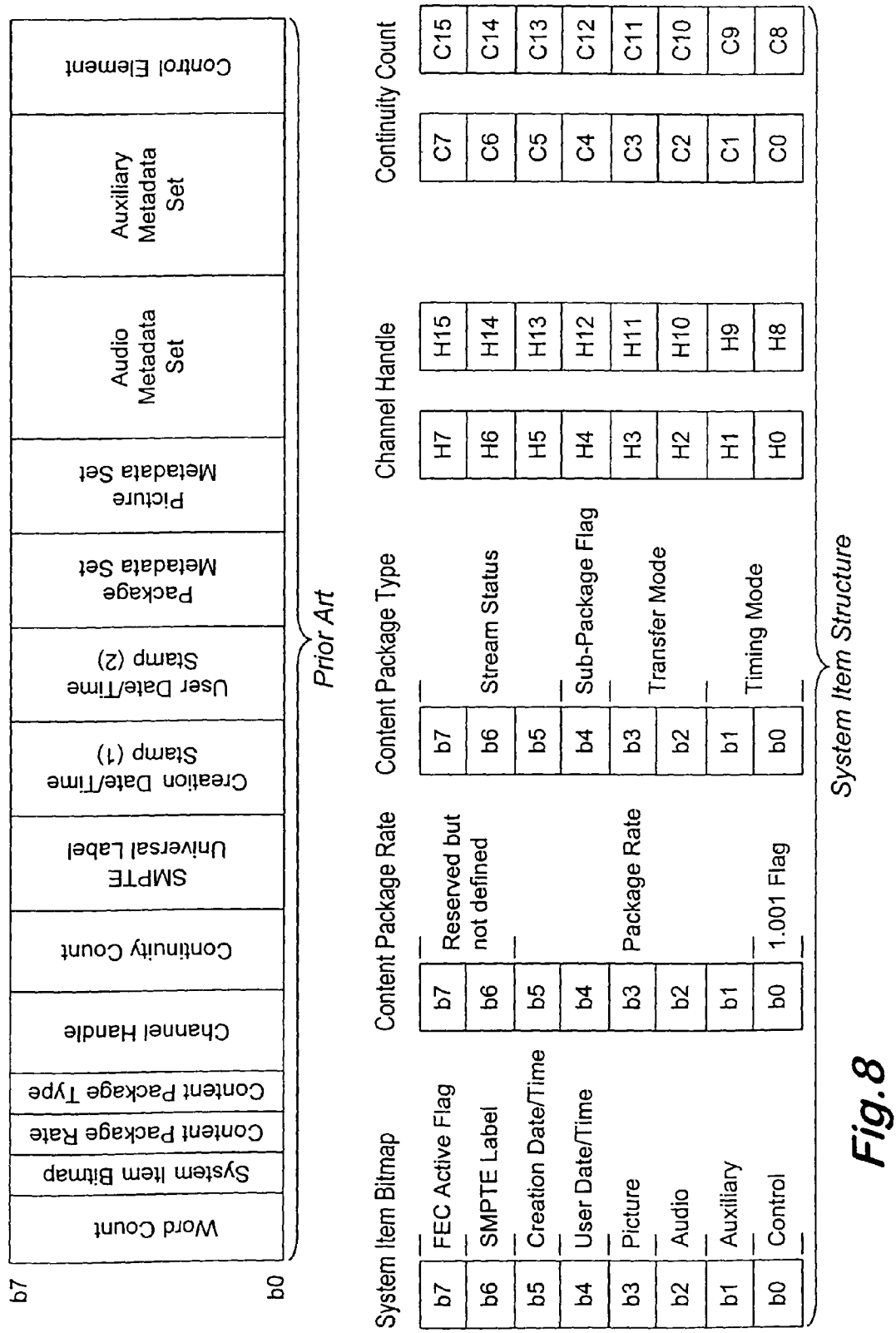
FIG. 8 shows the structure of part of a System Item.

Referring firstly to FIG. 2, a content package (CP) as used in embodiments of the present invention comprises a plurality of Items of which there are four types:

a System Item is a group of metadata Items related to the package itself and to the elements in the other 3 Items below;

a Picture Item is a group of up to 255 picture stream Elements;

an Audio Item is a group of up to 255 audio stream Elements; and an Auxiliary Item is a group of up to 255 auxiliary data Elements.

The Content Package contains the associated contents of one frame period, starting with a System Item and optionally containing one or more of the Picture, Audio and Auxiliary Items. It is essential that each Content Package contains a System Item.

The System Item is first in the order of Items in the Content Package and is followed by the or each other Item. In embodiments of the invention there is only one Item of any one type in a package: there cannot be two or more separate Items of the same type in a package. FIG. 4 illustrates an example of a Content Package.

The System Item in turn contains Metadata for the elements in the Picture, Audio and Auxiliary Items.

The Picture, Audio and Auxiliary Item may each contain one or more Elements.

Item Data Structure

In accordance with embodiments of the present invention, as shown in FIG. 5, the System, Picture, Audio and Auxiliary Items are each formatted as a variable length block beginning with a unique SMPTE Universal Label [SMPTE 298M, "Universal Labels for the Unique Identification of Digital Data"]. The format is 8 bit data entered into bits b0 to b7 of a 10 bit word. The Figures show only bits b0 to b7. For Type, Word Count and Data Block words, bit 8 is set to be the even parity of bits b0 to b7 and bit b9 is set to be odd parity as per SDTI.

The SDTI Data Type word values are set as follows:

System: '04h', Picture: '05h', Audio: '06h', Auxiliary: '07h' The Label is different for each Item in the package to provide unambiguous Item identification. The label is 16 bytes long and has a regular pattern for all bytes except the item Data Type. Therefore its detection will be very reliable. It will be noted that in comparison with the SDTI variable block of FIG. 3, there is no START CODE and no END CODE. Thus, the Item data structure of FIG. 5 does not offer the ability to provide a unique stop code as used in SDTI variable length blocks. The Word Count in each Item is therefore completed so that a decoder does not rely wholly on the detection of the label of the next Item (or an end-of-file marker).

Each Item follows the general model of Key-Length-Value, where the 'Key' identifies the data type, the 'Length' gives the data length and the 'Value' is the data itself. This principle allows a decoder to identify each component by the 'Key' and skip any component it cannot recognise using the 'Length' value to continue decoding data types with recognised 'Key' values.

The label has 16 bytes. It may be as set out in the following Table 1, by way of example:

TABLE 1

Specification of the Content Package Label

| Byte No. | Description | Value (hex) |
|---|---|---|
| 1 | Object Identifier | 06h |
| 2 | Label Size | 0Eh |
| 3 | Designation: ISO | 2Bh |
| 4 | Designation: SMPTE | 34h |
| 5 | Registry: Wrappers | 03h |
| 6 | Registry: SinipleWrappers | 01h |
| 7 | Standard: Content Package File | 02h |
| 8 | Version Number | 01h |
| 9 | Item Data Type | 04h-07h |
| 10-16 | Zero fill | 00h |

The 'Item Data Type' word (Byte 9) is defined for the four Items as follows:

System=04h, Picture=05h, Audio=06h, Auxiliary=07h. It will be appreciated that the bytes 1 to 8 have predefined values which are the same for all four types of Item. The byte 9 is variable according to the type of Item. Thus bytes 1 to 8 may be used as a video synchronisation code.

The form of the SMPTE Universal Label may be different to that shown in FIG. 1. The designations of the bytes may change and the hex values may change. However, with embodiments of the present invention, the Label has some bytes, e.g. 1 to 8 in Table 1 with predefined values, and at least one variable byte, e.g. byte 9 defining Data Type.

Note, that for compatibility with the SDTI-CP streaming wrapper, the Word Counts use the 'Little Endien' format i.e. the Least Significant byte is first.

The detailed structures of the System Item, and of the Picture, Audio and Auxiliary Items will now be discussed.

Picture, Audio and Auxiliary Item Structure

The Picture, Audio and Auxiliary Items have a common data structure where the Item Label is followed by a 4-byte Word Count and a 1-byte Item Header word defining the number of Elements in the Item. The data part then comprises the defined number of Element Data Blocks until the end of the Item as shown in FIG. 6.

Comparing FIGS. 5 and 6, the Item of FIG. 6 comprises the 16 byte label and Word Count, followed by the Item Data. The Item Data of the picture, audio and Auxiliary Items comprises an Item Header, followed by one or more Element Data Blocks of which 3 are shown by way of example. The maximum number of Element Date Blocks is for example 255.

It is recommended that the Word Count value is correctly set to the length of the Item data block. In extreme cases, the Word Count value can be set to zero to indicate an undefined block length but the successful decoding of subsequent Items then depends on the reliable detection of the Label of the next Item.

The value of the 1-byte Item Header word is the number of Elements in the range 1 to 255 (0 is not valid). The Item Header word is provided so that the number of Element Data Blocks is known in cases where the Item Word Count is set to zero.

However, if an Element uses an Element Word Count value of zero, the Item Word Count must also be zero (since it cannot calculate a true word count value from the unknown Element word count value) and therefore can only contain that Element as either the only Element, or as the last in a sequence. Since there is no provision to mark the end of such an Element, the only end marker available is the Label of the next Item (or the end-of-file marker).

Element Structure

Referring to FIG. 7, the common block structure for each Element is shown. Each Element Block starts with a 1 byte Element Type value to identify the type of Element, followed by a 4 byte Word Count of the Element Data block size, a 1 byte Element Number and completed by the Element Data itself.

The Element Type value identifies the type of element. This identification is additional to the 'Item Data Type' of the Item label.

Examples of Element Type are:

a Data Element which may contain lines of Teletext data of a video frame or field;

an Audio Element which may contain an AES 3 audio frame; and a Picture Element which may contain an MPEG-2 video frame coded as a Video Elementary Stream.

There may be more than one element type in an item. The Elements are identified individually (in addition to the Item) because the Elements may occur in any order after the System Item.

The Element Word Count is little-endien and its value is the length of the Element Data words plus '1' for the Element Number word. However, where the Element Word Count value is not known at the point of encoding; like the Item count, it may be set to zero to indicate an undefined data block length.

However, if an Element uses an Element Word Count value of zero, the Item Word Count must also be zero (since it cannot calculate a true word count value from the unknown Element word count value) and therefore can only contain that Element as either the only Element, or as the last in a sequence. There is no provision to mark the end of such an Element, in the illustrated file structures of the present invention as described hereinbelow. The value of the Element Number is 0 to 255 and is set to be unique amongst the elements in an Item. The Element Number will increment by one for each new element in sequence.

The System Item Structure

As shown in FIG. 2, the System Item comprises Metadata blocks. This system-level metadata describes the operation of the CP in various modes and provides key metadata Items related to the whole content package. It also contains package metadata together with metadata linked to elements in the Picture, Audio and Auxiliary Items. The System Item includes an optional downstream Control Element whose space is allocated but whose format is not defined herein but may be defined.

The metadata structures will be discussed in the following description.

Metadata Structures of System Item

The System Item contains a specific pre-defined metadata structure which is used to describe the package itself. It also contains general metadata structures for the package, picture, audio and auxiliary metadata.

System Item Metadata

The structure shown in FIG. 8 shows an example of a part of a System Item structure. The structure of FIG. 8 begins at bit $A_0$ and ends at bit $A_L$. Referring to FIG. 5, the structure of FIG. 8 corresponds to the section of FIG. 5 after the Item label and beginning at $A_0$ and ending at $A_L$. The structure of FIG. 8 is preceded by an Item Label as described above. The structure states at bit $A_0$ with a System Item Header of 7 bytes, followed by an optional SMPTE Universal Label [5], time stamps, package, picture, audio and auxiliary metadata sets and an optional Control element.

The System Item header is a packed metadata set which defines:

a System Item Bitmap word;
a Content Package Rate word;
a Content Package Type word, including stream status flags;
a Channel Handle word; and
a Continuity Count word.

Details of following parts of the data structure are known from, and are available in more detail, in the Pro-MPEG web site www.pro-mpeg.org. Thus only a summary of the key components now follows:

System Item Bitmap Content Package Rate and Type Words

These 3 words provide detailed information about the content package structure including the package rate, the type of package transfer and identification of the package components present.

Channel Handle

The Channel Handle word is used to identify a package channel in the case of transferring multiple package streams between two storage devices. Each package stream is assigned a different channel handle value by the encoder so that the decoder can separate the different incoming streams. This is an optional facility currently.

Continuity Count

The Continuity Count is a modulo 65536 counter which increments by '1' for each new package in the same stream. If the data transmission were to be interrupted, then the Continuity Count would allow decoders to detect the switch and take appropriate action.

SMPTE Universal Label

A SMPTE Universal Label (according to SMPTE 298M) may be added to identify this as a Content Package. This label also identifies the application decoder template so a decoder can detect all the components of the package are decodable.

Creation & User Time Stamps

Creation and user time stamps can be added to provide respectively, the package origination time and a user defined time. Both have a 1-byte time stamp identifier followed by 16 bytes of data. SMPTE 1 2M time-code is currently supported and future extensions such as the proposed SMPTE 309M (which defines a date format in the user bits) can be supported in the future.

Package, Picture, Audio and Auxiliary Metadata Sets

The first metadata set is the package metadata which contains metadata for the package as a whole; such as, for example, a programme title. This metadata does not require a 'link' Item as each component of the set is linked to the package as a whole rather than any part.

The subsequent metadata sets are Picture, Audio and Auxiliary. They are only present if the associated Picture, Audio and Auxiliary Item is present in the package. There is no point in having metadata describing a non-existent essence! Each Item of metadata in these sets has a 'link' Item which links the metadata to the associated Element.

The structure of each Metadata set will now be described with reference to FIGS. 9 and 10.

Metadata Set

The System Item of FIG. 2 or 8, comprises one or more Metadata sets. As shown in FIG. 9 each Metadata set starts with a 1-byte Metadata Count which defines the number of metadata blocks in the set. A Metadata Count value of '00h' is a valid value and indicates no Metadata Blocks. In this case, the metadata set is only one word long. The count byte is followed by Metadata blocks.

Metadata Block

Referring to FIG. 10, each Metadata block comprising a 1-byte metadata Type word, followed by a 2-byte Word Count word and completed by the metadata itself.

Picture, Audio and Auxiliary metadata blocks may be preceded by a 'Link' metadata block which provides a link between the metadata and the essence of the associated Element. A 'Link' metadata block will occur as many times as there are elements to link. Each time a 'Link' metadata Item is found, the immediately following metadata blocks will all refer to the linked element until the next 'Link' metadata Item is found. Since the 'Link' metadata Item is a very specific metadata component and of such a short length, it dispenses with the word count and comprises 3 words, as shown in FIG. 10;

A Metadata Link Type;
An Element Type; and
An Element Number.

The Link Metadata Items allow, in principle, the blocks of a Metadata set to be in any order. However, it is preferred that Metadata sets of different types be arranged in a predetermined order, for example as shown in FIG. 8.

File

Figure 11:
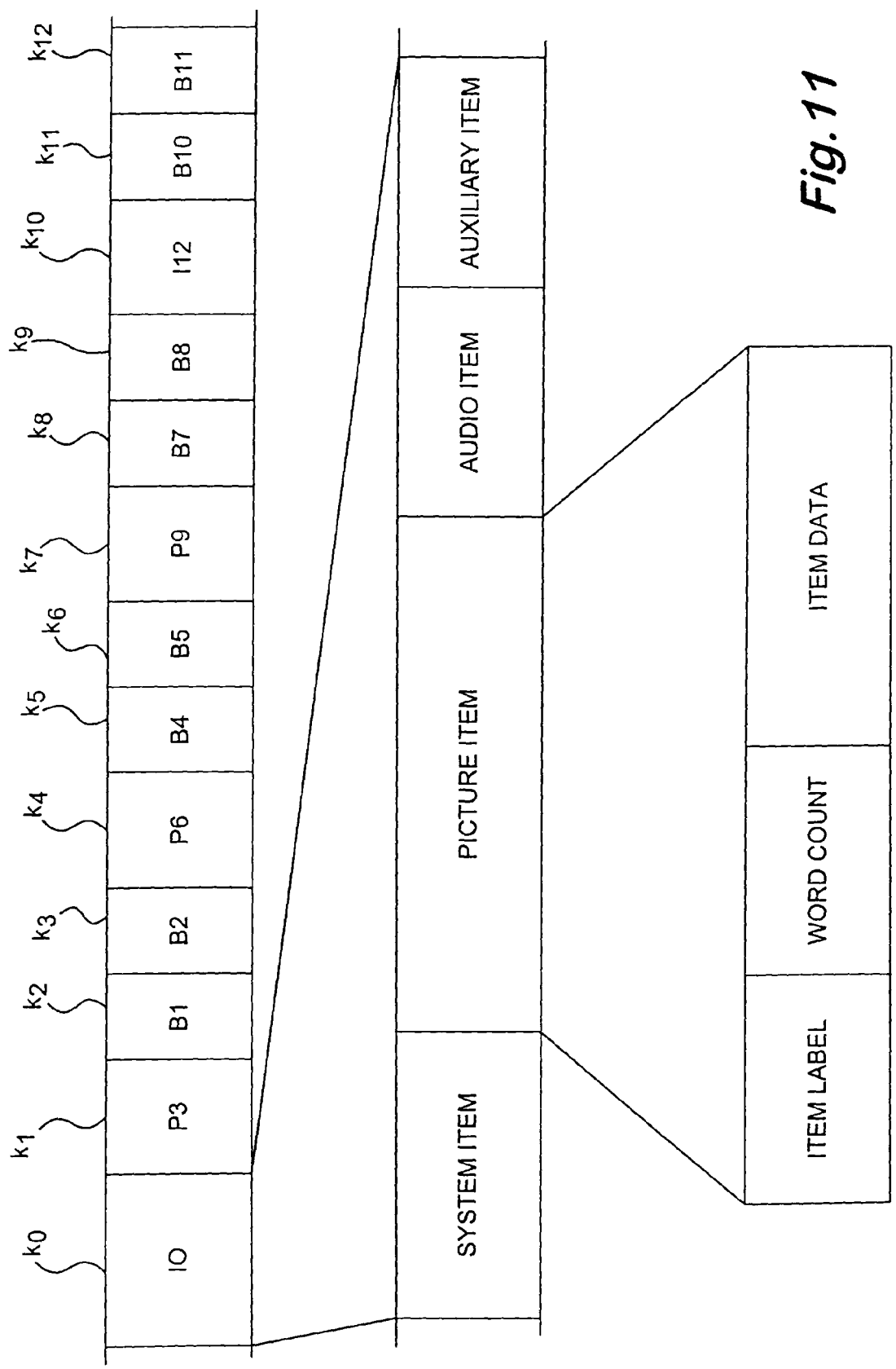
FIG. 11 shows, by way of example, a file structure according to the invention and comprising a concatenation of Content Packages.

Referring to the example of FIG. 11 an example of a file in accordance with the invention is shown. It comprises a sequence of content packages $K_o$-$K_n$ where n is 12 for example. A frame of encoded video is packaged with the other data to form a sequence of content packages. This Figure shows the notional frame-by-frame storage of a package sequence from left to right. Such a file may contain an unspecified number n of packages. In general n may be one or more. In a file storage system, the file location in memory is defined by the file start location and length as defined by the Operating System.

Package $K_0$ contains an I frame which, in accordance with an MPEG GOP, is the first frame, and in this case also the first package. The GOP ends with an I-frame $K_{10}$. Packages $K_1$, $K_4$ ... $K_7$ contain P frames. Packages $K_2$, $K_3$, $K_4$ ... $K_{11}$, $K_{12}$ contain B frames. The numbers in the packages indicate the display order of the frames. The packages and frames as shown in FIG. 11 are in processing order. They are so ordered to enable decoding of the B frames.

FIG. 11 shows that each Package e.g $K_o$ is structured as one Content Package as shown in FIG. 4, and that the System Item of each Content Package is structured as shown in FIG. 5 (and FIG. 8). That is the System Item starts with an Item Label, followed by a Word Count and Item Data as indicated by dotted lines in FIG. 11. Other items have the same form as indicated by the solid lines for a Picture Item.

Video Signal Processing System

Figure 12:
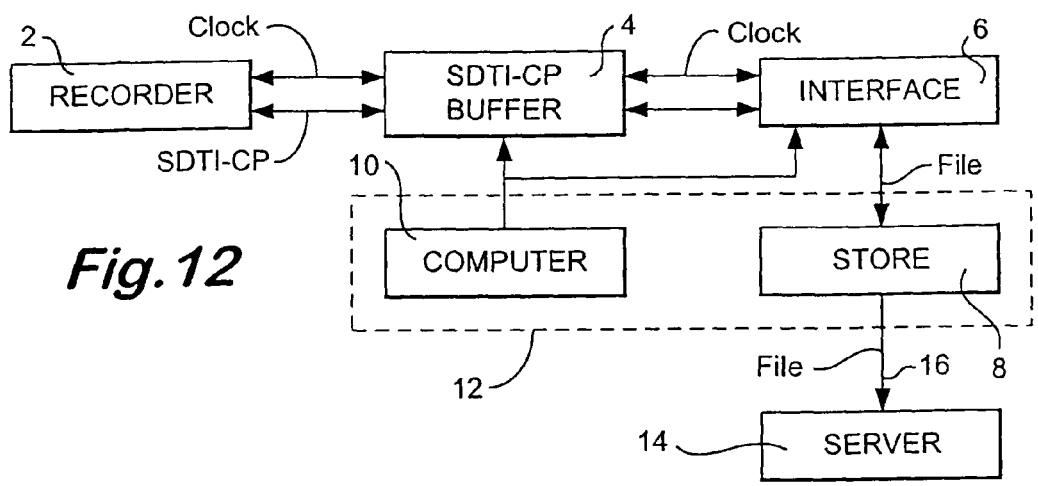
FIG. 12 is a schematic block diagram of a video signal processing system according to an embodiment of the invention.

Referring to FIG. 12, a video source 2 produces an SDTI-CP bitstream and clock. The SDTI-CP bitstream has the known structure shown in FIGS. 1, 2 and 3. The source may be a video tape recorder, video disc recorder or some other stream source. The SDTI-CP bitstream is fed to a buffer 4.

The buffer 4 detects and removes any gaps in the SDTI-CP bitstream; —such a bitstream may be produced in bursts. An interface 6 receiving the SDTI-CP bitstream and clock from the buffer 4 and converts the SDTI-CP bitstream in the buffer 4 into a file for storage in the computer system 12. It will be noted that the SDTI variable block of FIG. 3 has an END code and a START code provided by the DATAWORD following the SEPARATOR. The SDTI-CP bitstream is to be stored as a file in a computer system 12 having a data storage device 8 and a computer or microcontroller 10.

The interface 6 and buffer 4 are controlled by the computer 10. The interface 6 removes the START (i.e. separation and data type) and END codes from the variable blocks. The interface 6 adds Item Labels in place of the START codes. The result is a file which may be of arbitrary length. The file is stored in the storage device 8 under the control of the Operating System run by the computer 10. By way of example, the Operating System may have a File Allocation Table (FAT) which stores the File Names and the physical location(s) in the storage device in which the File is stored. In addition to the FAT, the Item Labels which replace the Item Type words indicate that the stored data is a file rather than a bitstream. The word counts in the Variable Blocks and in the Element Data Blocks are usable to find the end of the file, in addition to the use of the FAT.

By providing such a file format, data can be stored and accessed as a file like any conventional computer file. Access to files is relatively quick. Such a file can be copied, transferred as a file between servers, and otherwise processed like any other computer file. For example the computer system 12 may be one server. It may be linked to another server 14 or other file storage devices via a network link 16 such as Ethernet.

Furthermore, the System Item and the metadata in it allows random access to any Picture, Audio and Auxiliary Item in the file because the metadata is embedded in the bitstream which forms the content of the file. The System Item is accessible because it is labelled as such. The Picture data may be accessed to accuracy of one frame: see for example FIG. 11 in which individual I and P frames are in respective content packages each having a System Item and a Picture Item. Furthermore, the Item Labels can act as synchronisation codes because they have a predefined code (except for the Data Type code).

Various modifications may be made to the data structures according to the invention as described above. For example, the System Item may be modified to include a word or words defining the start and stop points of a clip, i.e. a sequence of video frames. The System Item may be modified to include words indicating the preroll and post-roll periods.

The buffer 4, under the control of the computer 10 may recreate the SDTI-CP bitstream from the file for storage in the recorder 2.

Figure 13:
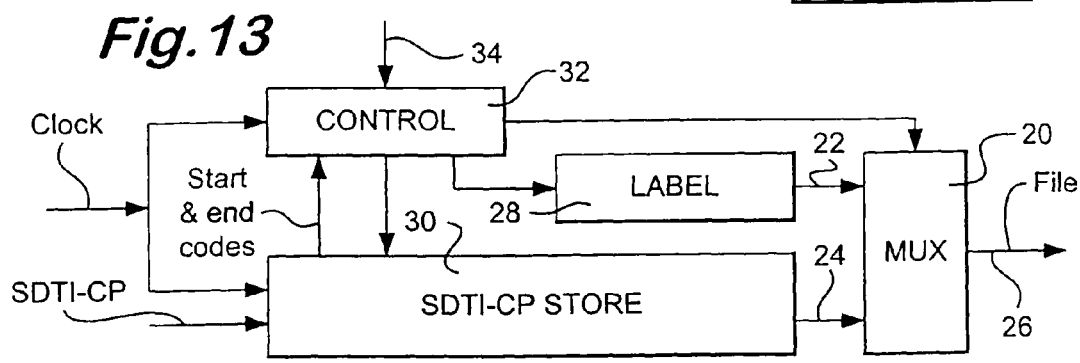
FIGS. 13 and 14 are schematic block diagrams of format converters in accordance with embodiments of the invention.
Figure 14:
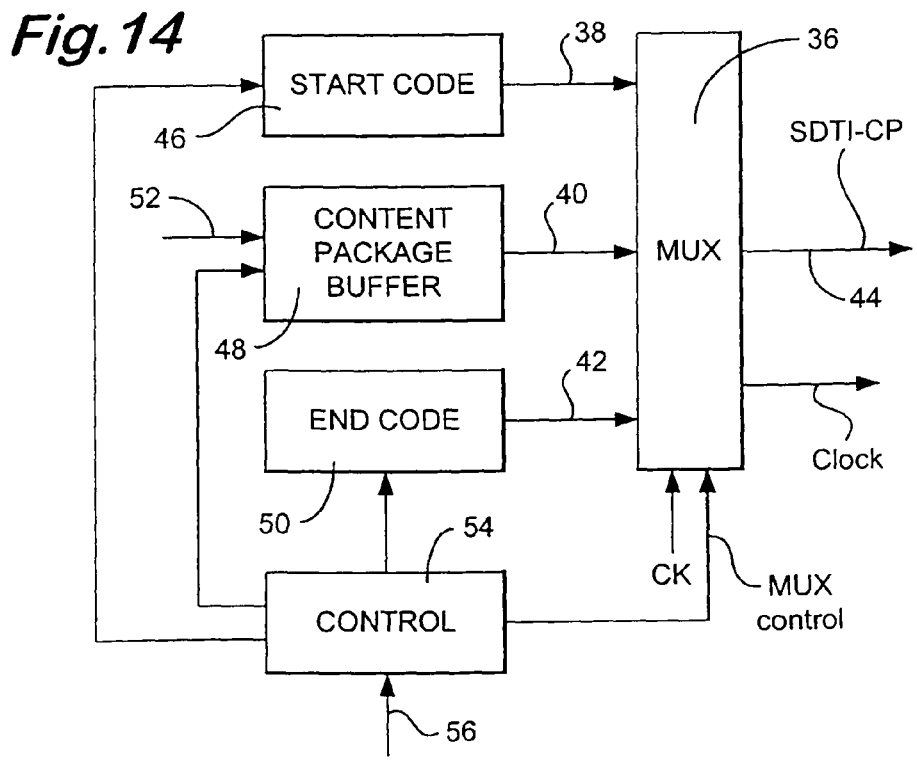

Referring to FIGS. 13 and 14, examples of format converters are shown. Referring to FIG. 13, the converter converts an SDTI-CP Item into an Item as shown in FIG. 5. A multiplexer 20 has first 22 and second 24 inputs and an output 26. A first store 28 is connected to the first input 22. The first store stores the SMPTE Universal labels. A second store connected to the second input stores, temporarily SDTI_CP Items having start and end codes. A controller 32 controls the writing of data into the stores and the reading of data from the stores under the control of e.g. the computer 10 of FIG. 12 from which it receives data and control signals via connection 34. The controller writes an SDTI Item into the store 30. It receives the clock signal associated with the SDTI Item. It also receives the start and end codes to enable the writing of one item into the store 30. It may write only the word count and the data or it may write the whole Item including the start and end codes at the choice of the designer. It writes the label into the first store. The label is read out to the first input 22 of the multiplexer 20 followed by the word count and data of the Item which are read out to the second input 24. The multiplexer outputs an Item as shown in FIG. 5 at its output 26. A plurality of concatenated Items form a content package as described above and the packages are concatenated to form a file. The file does not have an associated clock.

The reverse process is performed by the converter of FIG. 14. A multiplexer 36 has first 38, second 40 and third 42 inputs and an output 44. A first store 46 storing the start code is connected to the first input. A second store or buffer 48 stores an Item of a Content Package of a file, and is connected to the second input 40. A third store 50 stores the end code and is connected to the third input 42. A controller 54 controls the writing of data into the stores and the reading of data from the stores under the control of e.g. the computer 10 of FIG. 12 from which it receives data and control signals via a port 56. The controller reads the start code from the first store followed by the Item Type word, word count and data of the Item stored in second store 48 followed by the end code stored in the third store 50. The multiplexer combines the start code, Item type word, the word count and the data to output an SDTI-CP Item.

A clock signal is provided at an input CK of the multiplexer and output on a separate clock output.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed as new and desired to be secured by Letters Patent of the United States is:

1. A non-transitory computer readable storage medium having stored thereon a signal having a signal format comprising:
   a Content Package having at least a System Item and one or more of a Picture Item, an Audio Item and an Auxiliary Item,
   wherein each of the System, Picture, Audio and Auxiliary Items comprises:
   a Label having a predetermined number of bytes, and including at least one byte identifying the Item;
   a word count indicating the number of bytes of data of the Item; and
   the data of the Item, and
   the data of the System Item includes sets of metadata related to the one or more of the Picture Item, the Audio Item and the Auxiliary Item, each set of metadata including a metadata block count indicating a number of blocks of metadata in the set and the blocks of metadata.

2. The computer readable medium according to claim 1, wherein the Label has a fixed number of bytes having preassigned values and at least one byte of variable value for identifying an item.

3. The computer readable medium according to claim 1, wherein the said data of each Item comprises one or more Element data blocks, each Item also having an Item header, preceding the element data block, and indicating the number of element data blocks in the Item.

4. The computer readable medium according to claim 3, wherein each Element data block comprises:
   at least one word indicating the number of words in the Element, and if greater than zero, at least one word defining the type of element and at least one word indicating the number of the Element, and the data of the Element.

5. The computer readable medium according to claim 1, wherein the metadata includes link metadata which links metadata relating to an Element to the Element to which it relates.

6. The computer readable medium according to claim 1, wherein the Label has a predetermined fixed format except for the said byte identifying the Item.

7. The computer readable medium according to claim 1, wherein each Content Package includes one video frame.

\* \* \* \* \*